United States Patent

[11] 3,612,368

| [72] | Inventors | Tokusaburo Kakiuchi;<br>Hideaki Akiyama, both of Tokyo, Japan |
|---|---|---|
| [21] | Appl. No. | 841,796 |
| [22] | Filed | July 15, 1969 |
| [45] | Patented | Oct. 12, 1971 |
| [73] | Assignee | Kabushiki Kaisha Ricoh<br>Tokyo, Japan |
| [32] | Priority | July 15, 1968 |
| [33] | | Japan |
| [31] | | 43/49765 |

[54] FILM LOOP FORMING DEVICE FOR SMALL-SIZED CINEPROJECTOR
3 Claims, 3 Drawing Figs.

[52] U.S. Cl. .................................................. 226/13,
226/121
[51] Int. Cl. ........................................................ B65h 17/26
[50] Field of Search ............................................ 226/121,
169, 113, 117, 13, 60

[56] References Cited
UNITED STATES PATENTS

| 2,371,504 | 3/1945 | Cheney et al. ................. | 226/117 (X) |
| 3,351,253 | 11/1967 | Nemeth ........................ | 226/13 |

*Primary Examiner*—Richard A. Schacher
*Assistant Examiner*—Gene A. Church
*Attorney*—Burgess, Ryan & Hicks ABSTRACT: A film loop forming device for a small-sized cineprojector comprising a pulldown mechanism drivingly coupled to a drive mechanism and a sprocket wheel mechanism driven through a spring by the drive mechanism whereby the rotation of the sprocket lags behind that of the drive mechanism because of the compression of the spring due to the inertia of the driven mechanism, the film winding resistance, and the rotary frictional resistance, thereby forming a loop between the pulldown mechanism and the sprocket.

PATENTED OCT 12 1971          3,612,368

INVENTORS
TOKUSABURO KAKIUCHI
HIDEAKI AKIYAMA
BY Burgess, Ryan & Hicks
ATTORNEYS

FILM LOOP FORMING DEVICE FOR SMALL-SIZED CINEPROJECTOR

BACKGROUND OF THE INVENTION

The present invention relates to a film loop forming device for a cineprojector and especially for a small-sized cineprojector.

There has been proposed a film loop forming device of the type in which a pin is disposed inwardly of the film loop so that when the film loop is extended under tension the pin is so actuated as to reduce the film driving speed. However, the above device is complicated in mechanism and expensive to manufacture.

One of the objects of the present invention is to eliminate the defects encountered in the conventional film loop forming mechanism, to make the construction of a cineprojector simple and to reduce the cost.

SUMMARY OF THE INVENTION

In brief, the present invention provides a film loop forming device for a small-sized cineprojector comprising a pulldown mechanism drivingly coupled to a drive mechanism, and a sprocket wheel mechanism driven through a spring by the drive mechanism, whereby the rotation of the sprocket wheel mechanism is lagged behind that of the drive mechanism because the above described coupling spring is compressed prior to the rotation of the sprocket wheel mechanism due to the intertia thereof, the film winding resistance, the rotary frictional resistance, etc., thereby forming a film loop between the pulldown mechanism and the sprocket wheel.

According to one embodiment of the present invention, a pulldown mechanism is drivingly coupled to a drive shaft and a sprocket wheel carried by a driven shaft is rotated through a worm carried by the drive shaft, a gear being in mesh with the worm, a pin extending from the gear and in engagement with a spring loaded in an arcuate slot formed in a rotary driven disk carried by the driven shaft, which also carries a flywheel. Upon rotation of the drive shaft, the film is advanced intermittently by the pulldown mechanism, but as described hereinabove the sprocket wheel carried by the driven shaft remains stationary for a relatively short time and then is rotated with an angle of delay relative to the drive shaft which is determined by the degree of compression of the spring, whereby a loop is formed between the pulldown mechanism and the sprocket wheel.

The above and other objects, features and advantages of the present invention will become more apparent from the following description of an illustrative embodiment thereof with reference to the accompanying drawing.

DESCRIPTION OF THE PREFERRED EMBODIMENT

Figure 1:
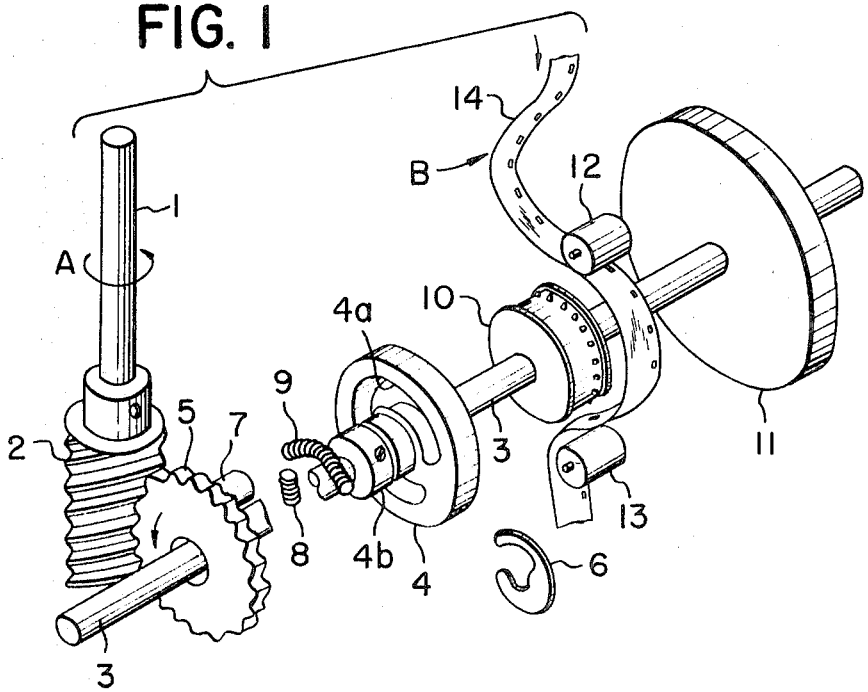
FIG. 1 is an exploded view of one embodiment of the present invention.

At the free end of a drive shaft 1 is carried a worm 2 and a driven disk 4 is carried by a driven shaft 3 intersecting the drive shaft at 90°. The disk 4 has an elongated arcuate slot 4a and a gear 5 is rotatably carried by a hollow boss 4b of the driven disk 4. The axial movement of the gear 5 is limited by means of an E-shaped ring 6. A pin 7 extending from the gear 5 is loosely fitted into the slot 4a of the disk 4 and a spring 8 is loaded between the pin 7 and one end of the slot 4a while a spring 9, between the pin 7 and the other end of the slot 4a. A sprocket wheel 10 and a flywheel 11 are carried by the driven shaft 3 and a film 14 is engaged with the pawls of the sprocket wheel 10 and guided by guide rollers 12 and 13.

Figure 3:
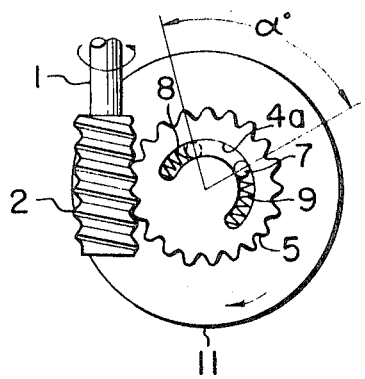

Next the mode of operation will be described hereinafter. Upon driving the projector, drive shaft 1 rotates in the direction indicated by the arrow while the film is advanced intermittently by means of a pulldown mechanism not shown. The worm 2 rotates the gear 5 so that the pin 7 tends to rotate the disk 4 through the spring 9, but because of the inertia of the flywheel 11, the winding resistance of the film 14, the frictional resistance of the rotary members, etc., the spring 9 is compressed so that the disk 4 is started to be rotated behind the rotation of the gear 5 as shown in FIG. 3. Thereafter, the gear 5 remains in this relation with respect to the disk 4. Because of the rotation of the driven member behind the rotation of the drive member as described hereinabove, a loop B is formed between the pulldown mechanism and the sprocket wheel 10. In this case, the angle of delay $a°$ varies between $a° \pm \Delta a°$ for 1 or 1/2 seconds after the start because the spring is not in equilibrium state, but this variation only causes the slack of the loop B to vary accordingly so that the film may be advanced without any deleterious influence.

Figure 2:
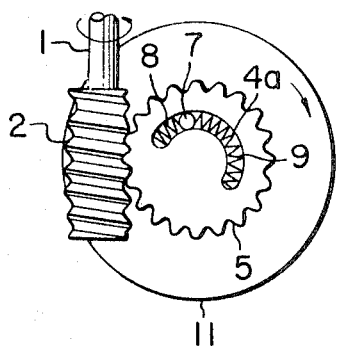
FIGS. 2 and 3 are front views illustrating the relation between the driving and driven mechanisms respectively, FIG. 2 illustrating the inoperative state while FIG. 3, the operative state.

When the projector is stopped, the compressed pin 9 extends so as to return the spring 7 to its normal position where the forces of the springs 8 and 9 are balanced as shown in FIG. 2.

We claim:

1. Intermittent film advancement mechanism in a cineprojector for forming a film loop comprising a drive shaft mounted in the cineprojector;

a first gear fixed on said drive shaft for rotation therewith;

a driven shaft free from a direct engaging connection to said drive shaft;

a second gear mounted to rotate freely on said driven shaft, said second gear engaged with and rotatable by said first gear;

a disk, a sprocket wheel and a flywheel fixedly mounted on said driven shaft to rotate therewith; and means connecting said disk and said second gear in a resilient driving relationship, said means comprising a projecting element adapted to compress a spring to transmit a force to said disk that lags behind the driving force from said drive shaft to form the loop of film.

2. The mechanism of claim 1 in which said first gear comprises a worm gear, said second gear includes said projecting element projecting therefrom in the shape of a pin, and a slot is formed in said disk to receive said spring.

3. The mechanism of claim 1 in which said sprocket wheel is located between said flywheel and said disk, guide rollers for the film are provided adjacent said sprocket wheel, and the loop of film is provided adjacent one of said guide rollers.